(12) United States Patent
Jewell et al.

(10) Patent No.: US 9,694,974 B2
(45) Date of Patent: Jul. 4, 2017

(54) ITEM STORAGE, DISPENSING, AND RECEIVING SYSTEM, APPARATUS, METHODS, AND APPLICATIONS

(71) Applicant: FAIRFIELD INDUSTRIES INCORPORATED, Sugar Land, TX (US)

(72) Inventors: Stephen W. Jewell, Alvin, TX (US); Larry E. Berges, New Iberia, LA (US)

(73) Assignee: FAIRFIELD INDUSTRIES INCORPORATED, Sugar Land, TX (US)

( * ) Notice: Subject to any disclaimer, the term of this patent is extended or adjusted under 35 U.S.C. 154(b) by 0 days.

(21) Appl. No.: 14/772,859

(22) PCT Filed: Mar. 6, 2014

(86) PCT No.: PCT/US2014/021180
§ 371 (c)(1),
(2) Date: Sep. 4, 2015

(87) PCT Pub. No.: WO2014/138390
PCT Pub. Date: Sep. 12, 2014

(65) Prior Publication Data
US 2016/0009491 A1    Jan. 14, 2016

Related U.S. Application Data

(60) Provisional application No. 61/774,131, filed on Mar. 7, 2013.

(51) Int. Cl.
*B65G 1/02* (2006.01)
*B65G 1/04* (2006.01)

(52) U.S. Cl.
CPC ............. *B65G 1/0471* (2013.01); *B65G 1/02* (2013.01); *B65G 1/026* (2013.01); *B65G 1/0464* (2013.01)

(58) Field of Classification Search
CPC ........ B65G 1/02; B65G 1/026; B65G 1/0471; B65G 1/0464; B65G 1/06
See application file for complete search history.

(56) References Cited

U.S. PATENT DOCUMENTS 2,894,641 A * 7/1959 Edwards, Jr. ........ A47B 47/022
                                                   211/134
4,062,458 A * 12/1977 Manini ................... B29B 15/02
                                                   414/268
(Continued)

FOREIGN PATENT DOCUMENTS

CH    EP 2982624 A1 * 2/2016 ........... B65G 57/302
DE    102009021467       11/2010
(Continued)

OTHER PUBLICATIONS

International Search Report and Written Opinion for International Application No. PCT/US2014/021180, international filing date Mar. 6, 2014, 12 pages.

*Primary Examiner* — Kaitlin Joerger
(74) *Attorney, Agent, or Firm* — Bond, Schoeneck & King, PLLC; William Greener

(57) ABSTRACT

An item storage, dispensing, and receiving apparatus includes a frame assembly having a height and length, including at least one section thereof having two opposing side wall sections, wherein each opposing side wall section includes vertically spaced rails disposed on an inner surface thereof such that each rail on a respective side wall section is located opposite a corresponding rail on the opposing side wall section, further wherein the at least one section has an open space fully extending between the vertically spaced rails between the two opposing side wall sections over the height and length, and a conveyance mechanism located within the open space along at least a portion of the length, wherein the conveyance mechanism is movable in a vertical (Continued)

direction in the open space along the height. A method for moving an item in a tiered, spaced relation involves the steps of vertically moving an item conveyance mechanism from a position below a lowest tiered item until it engages the item or from a position above a highest tiered item until it engages the item, and horizontally conveying the engaged item to a location different than the horizontal engagement location of the item.

16 Claims, 14 Drawing Sheets

(56) References Cited

U.S. PATENT DOCUMENTS

| | | | |
|---|---|---|---|
| 4,392,768 A * | 7/1983 | Van Capelleveen | B65G 47/5113 198/801 |
| 4,690,601 A * | 9/1987 | Delius | B65G 1/02 211/128.1 |
| 4,872,800 A * | 10/1989 | Gutov | B65G 1/0471 187/262 |
| 5,184,738 A * | 2/1993 | Allen | B65G 1/026 211/151 |
| 5,211,296 A * | 5/1993 | D'Heygere | B65G 1/026 211/1.57 |
| 6,776,298 B2 * | 8/2004 | Courtwright | B65G 1/026 211/183 |
| 7,114,904 B2 * | 10/2006 | Charbonneau | B65G 1/026 211/59.2 |
| 7,686,560 B2 * | 3/2010 | Laurin | B65G 1/0407 198/469.1 |
| 2003/0228208 A1 * | 12/2003 | Grond | B65G 1/0471 414/267 |
| 2009/0028675 A1 | 1/2009 | Tsujimoto et al. | |
| 2015/0101998 A1 * | 4/2015 | Keck | A47B 47/028 211/49.1 |
| 2015/0114919 A1 * | 4/2015 | Lee | B65G 1/02 211/85.5 |

FOREIGN PATENT DOCUMENTS

| | | |
|---|---|---|
| EP | 0026545 | 4/1981 |
| FR | 2294943 | 7/1976 |
| GB | 872479 | 7/1961 |
| GB | 2293870 | 4/1996 |
| JP | 59043704 A | 3/1984 |
| JP | 2001072207 A | 3/2001 |
| WO | 2013004615 A1 | 1/2013 |

* cited by examiner

US 9,694,974 B2

ITEM STORAGE, DISPENSING, AND RECEIVING SYSTEM, APPARATUS, METHODS, AND APPLICATIONS

RELATED APPLICATION DATA

The instant application claims priority to U.S. provisional application Ser. No. 61/774,131 filed Mar. 7, 2013, the subject matter of which is incorporated herein by reference in its entirety.

BACKGROUND

Aspects and embodiments of the invention are directed to item handling systems, methods, and applications thereof. More particularly, a storage, dispensing, and receiving system and associated methods adapted for seismic sensors (nodes). Most particularly, a storage, dispensing, and receiving system and associated methods adapted for nodes in a marine environment. A seismic sensor ('node') handling system is described in co-owned U.S. Pat. No. 8,087,848. The '848 patent describes a node storage device comprised of a series of independently actuatable conveyor sections horizontally oriented one above the other at different, fixed heights above the back deck of the ship. These sub-systems are replicated side-by-side and end-to end so as to provide storage for, and more importantly fast access to, a large number of nodes. The speed with which nodes can be delivered to the node deployment/recovery workstation limits in part the maximum speed at which the entire node deployment/recovery operation can be conducted, including vessel speed. The main reason each node has a place on an independently actuatable conveyor is for speedy access and (horizontal) transit.

While this system has been employed successfully, there are recognized shortcomings in its design. There is vast amount of machinery to purchase, install, and maintain related to the conveyors themselves. Each conveyor belt has its own motors, gears, sprockets, bearings, and slip surfaces. Since each belt is continuous, it traverses the length of the storage rack twice. In one installation almost two miles of conveyor belt are required to store fewer than 3000 nodes. The physical space required for the storage and conveyance structures presents another issue. The nodes themselves are heavy, requiring the conveyor mechanism on which they rest to be of substantial mechanical strength. The conveyors, at a minimum, must be separated vertically by S=the sum of: 1) the height of the nodes; 2) the height of the conveyor machinery; and 3) space for the belt to traverse the return path beneath the conveyor machinery without interference. In many instances the conveyors and their related machinery may consume more space than the nodes themselves. This drastically reduces the density of node storage possible in a given space. For any given number of nodes this may require a larger vessel than might otherwise be necessary and the substantial cost associated therewith.

For these reasons and others appreciated by those skilled in the art, there exists a need for a node storage, dispensing, and receiving apparatus and method that maintains current or provides improved speed of access, and further provides higher storage density and reduced complexity and machinery to purchase, install, and maintain than available under the current state of the art.

Definitions as Used Herein

The term 'about' means the amount of the specified quantity plus/minus a fractional amount (e.g., ±10%, ±9%, ±8%, ±7%, ±6%, ±5%, ±4%, ±3%, ±2%, ±1%, etc.) thereof that a person skilled in the art would recognize as typical and reasonable for that particular quantity or measurement. Likewise, the term 'substantially' means as close to or similar to the specified term being modified as a person skilled in the art would recognize as typical and reasonable; for e.g., within typical manufacturing and/or assembly tolerances, as opposed to being intentionally different by design and implementation.

SUMMARY

The most general aspects of the invention are an item storage, dispensing, and receiving apparatus and method.

An aspect of the invention is an item storage, dispensing, and receiving apparatus that includes a frame assembly having a height, H, and a length, L, including at least one section thereof having two opposing side wall sections, wherein each opposing side wall section includes a plurality of vertically spaced rails disposed on an inner surface thereof such that each rail on a respective side wall section is disposed opposite a corresponding rail on the opposing side wall section, further wherein the at least one section has an open space fully extending intermediate the plurality of vertically spaced rails between the two opposing side wall sections over the height H and the length L, and one or more conveyance mechanisms operatively disposed within the open space along at least a portion of the length L, wherein the one or more conveyance mechanisms are movable in a vertical direction traversing the open space along the height H. According to various exemplary, non-limiting embodiments, the method may include the following additional steps, features, limitations, and/or characteristics:

wherein the plurality of vertically spaced rails are rigidly attached to the frame assembly such that the frame assembly is characterized by having no moving parts;
wherein the one or more conveyance mechanisms comprise powered conveyor belts and are coupled to one or more lifting mechanisms adapted to controllably position the one or more conveyance mechanisms in the vertical direction in the open space along the height H of the frame assembly;
wherein the one or more lifting mechanisms are disposed below the one or more respective conveyance mechanisms;
wherein the one or more respective lifting mechanisms are disposed on a portion of the frame assembly;
further comprising a track disposed in the open space adjacently below a lowest corresponding set of rails of the frame assembly along at least a portion of the length L, wherein the one or more conveyance mechanisms are movably coupled to the track;
wherein the frame assembly has an item-input/output end, further comprising a bridge conveyance mechanism having a first end and a second end, further wherein one of the first end and the second end of the bridge conveyance mechanism is operatively coupled to a leading one of the one or more conveyance mechanisms at the input/output end of the frame assembly such that as the one or more conveyance mechanisms move in a vertical direction traversing the open space along the height H, the bridge conveyance mechanism pivots about the other of the first end and the second end thereof so as to provide a continuous path between the leading one of the one or more conveyance mechanisms at the input/output end of the frame assembly and the bridge conveyance mechanism;

further comprising at least two of the frame assemblies and respective one or more conveyance mechanisms disposed immediately sideways adjacently;

wherein each of the frame assemblies has an item-input/output end, further comprising a bridge conveyance mechanism having a first end and a second end, further wherein one of the first end and the second end of the bridge conveyance mechanism is operatively coupled to a leading one of the one or more conveyance mechanisms of one of the at least two of the frame assemblies at the input/output end thereof such that as the one or more conveyance mechanisms move in a vertical direction traversing the open space along the height H, the bridge conveyance mechanism pivots about the other of the first end and the second end thereof so as to provide a continuous path between the leading one of the one or more conveyance mechanisms of one of the at least two of the frame assemblies at the input/output end and the bridge conveyance mechanism, further wherein the bridge conveyance mechanism is laterally repositionable such that it can be operatively coupled to the leading one of the one or more conveyance mechanisms of the other one of the at least two of the frame assemblies at the input/output end thereof;

further comprising a plurality of the immediately sideways adjacent at least two of the frame assemblies and respective one or more conveyance mechanisms disposed sideways adjacently;

wherein each of the frame assemblies has an item-input/output end, further comprising a plurality of bridge conveyance mechanisms each having a first end and a second end, further wherein one of the first end and the second end of each of the bridge conveyance mechanisms is operatively coupled to a leading one of the plurality of the immediately sideways adjacent at least two of the frame assemblies and respective one or more conveyance mechanisms at the input/output ends thereof such that as the one or more conveyance mechanisms move in a vertical direction traversing the open space along the height H, each of the respective bridge conveyance mechanisms pivots about the other of the first end and the second end thereof so as to provide a continuous path between the leading ones of the one or more conveyance mechanisms of one of the plurality of the frame assemblies at the input/output ends and the bridge conveyance mechanisms, further wherein the bridge conveyance mechanisms are laterally repositionable;

wherein each of the frame assemblies has an item-input/output end, further comprising a different conveyance mechanism disposed adjacently transverse to the input/output ends of the plurality of the immediately sideways adjacent at least two of the frame assemblies;

wherein the different conveyance mechanism comprises a plurality of linearly adjacent conveyance mechanisms aligned in a horizontal plane;

further comprising a plurality of hanging arms each pivotally connected at a region thereof to an activation member that is connected to the frame assembly, wherein each of the plurality of rails is fixedly attached to a distal region of each of the hanging arms, further wherein at least portions of the side walls have cut-out regions such that, upon activation of the activation member, the rails are movable into and out of the cut-out regions such that the rails are, respectively, disposed out of or in the open space;

the apparatus replicated end on end;

further wherein only a single conveyance mechanism is disposed in the open space traversable by the respective one or more conveyance mechanisms;

further wherein the one or more conveyance mechanisms that are movable in a vertical direction traversing the open space along the height H of the frame assembly are disposed in vertical opposition;

wherein the item is one or more seismic sensor nodes, movably disposed on the rails.

An aspect of the invention is an item storage, dispensing, and receiving apparatus including a frame assembly having a height, H, and a length, L, including at least one section thereof having two opposing side wall sections, wherein each opposing side wall section includes a plurality of vertically spaced rails disposed on an inner surface thereof such that each rail on a respective side wall section is disposed opposite a corresponding rail on the opposing side wall section, further wherein the at least one section has an open space fully extending intermediate the plurality of vertically spaced rails between the two opposing side wall sections over the height H and the length L; a track disposed adjacent a top of the frame assembly over the open space along at least a portion of the length L; and a horizontal conveyance mechanism moveably coupled to the track, wherein the conveyance mechanism is further moveable in a vertical direction traversing the open space along the height H. According to various exemplary, non-limiting embodiments, the method may include the following additional steps, features, limitations, and/or characteristics:

wherein the conveyance mechanism includes a hanger member adapted to engage the item for movement.

An aspect of the invention is an item moving method for moving at least one of a plurality of items vertically disposed in tiered, spaced relation including the steps of vertically moving an item conveyance mechanism from at least one of a position below a lowest tiered item until it engages the item and from a position above a highest tiered item until it engages the item; and horizontally conveying the engaged item to a location different than the horizontal engagement location of the item.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

DETAILED DESCRIPTION

Figure 1:
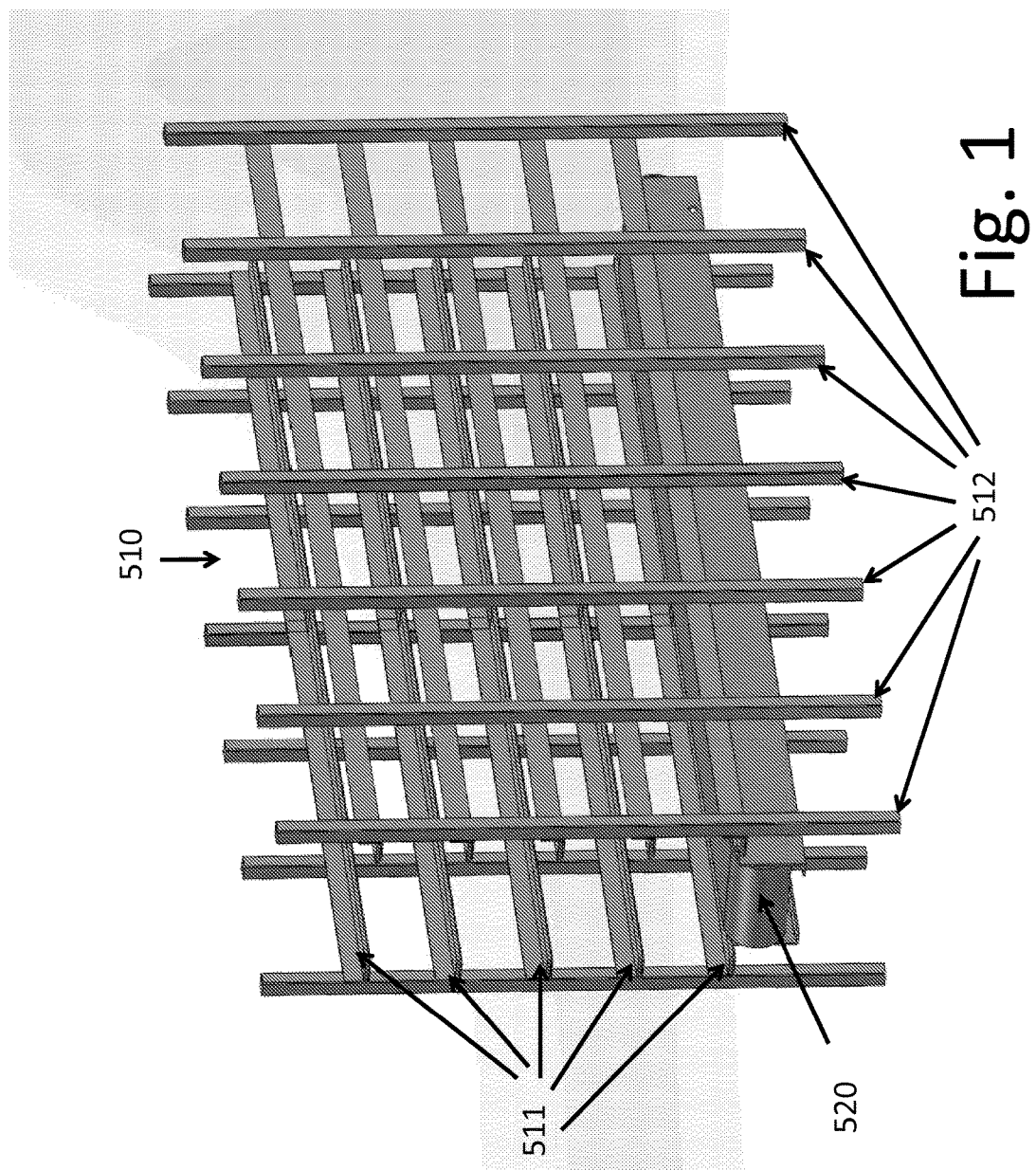
FIG. 1 schematically illustrates a rigid frame or rack portion or section and an associated conveyance mechanism of an item storage, dispensing, and receiving apparatus, according to an illustrative aspect of the invention.
Figure 7:
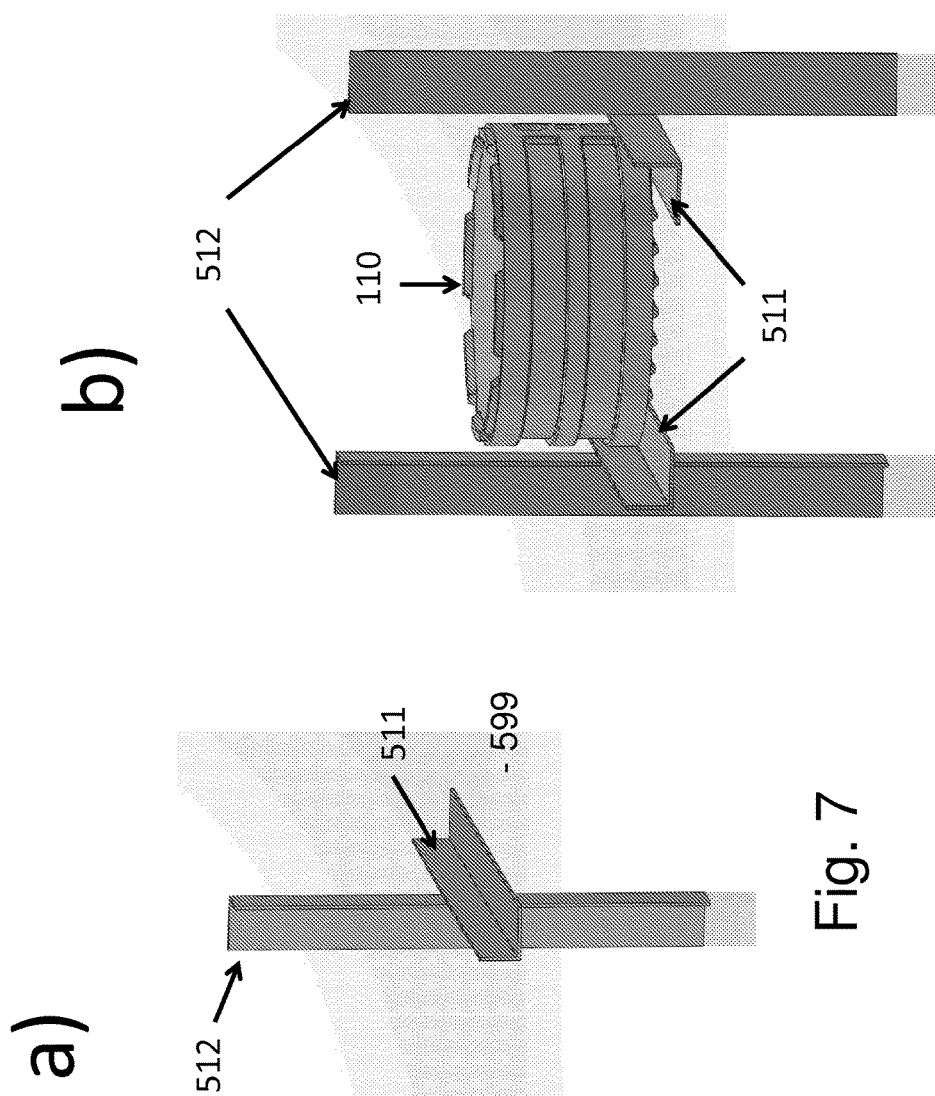
FIGS. 7a, 7b schematically illustrate details about the rack portion of the apparatus shown in FIG. 1, according to an illustrative aspect of the invention.

FIG. 1 illustrates at least a portion (e.g., a section) of a rigid frame or rack 510 having no moving parts and constructed as indicated, looking much like a baker's rack; that is, a series of spaced vertical support members are connected by spaced horizontal supports 511 (e.g., angle iron geometry forming opposing walls, providing a solution to the aforementioned problems. The spaced horizontal supports include horizontal shelf sections 599 (see also FIG. 7a) that can support an item (e.g., a node) at its edge (see also FIG. 7b) and thus a plurality of items in a tiered fashion (five tiers shown in FIG. 1 for example only). The rack 510 may be made steady affixed to the floor or bottom of the ship deck, or to a bottom structure and at the top by an upper structure, e.g., an overhead deck (not shown). The rack 510 may be constructed of inexpensive metal angle and pipe, welded, or a suitable plastic or other material. Advantageously, in the embodied aspect there are no moving parts to the rack and the racks may be easily and inexpensively mass-produced.

Figure 2:
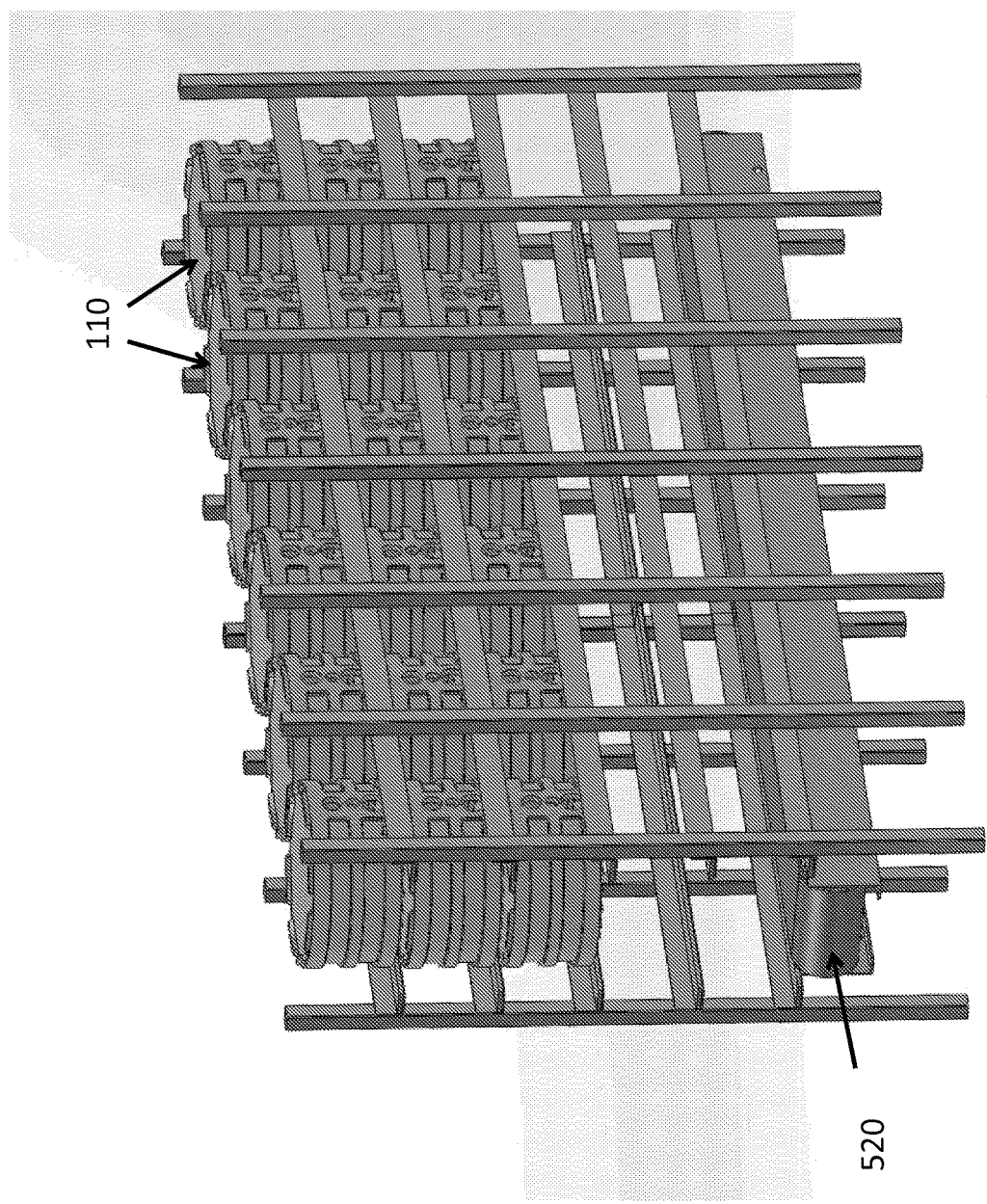
FIG. 2 schematically illustrates the apparatus of FIG. 1 with a plurality of items (nodes) situated therein, according to an illustrative aspect of the invention.

Nodes 110 are supported on the horizontal supports 511 at their edges alone, the center of the rack, i.e., the space intermediate the opposing walls, being completely open as illustrated in FIG. 2. Given this property, nodes on any tier (level) can be accessed by a horizontal conveyance mechanism 520 (e.g., a single conveyor belt as shown) whose vertical position within the open space between the walls can be adjusted. The horizontal supports 511 thus need be spaced no further apart than the nominal height of a node (or other 'item'), permitting much denser vertical storage than the belt-per-level arrangement in present systems such as described in the aforementioned US '848 patent. Each tier shares the same horizontal transport mechanism by virtue of the vertically repositionable conveyance mechanism 520, reducing by a factor of N (where N is number of tiers) the amount of transport machinery to purchase, install and maintain. If the node height is h and the vertical separation of tiers (in conveyor-per-level configuration) is S, vertical node density is increased approximately 1+S/h. For example, node density on assignee's marine vessel was increased by a factor of 2.26; from 1800 nodes to over 4000.

Figure 3:
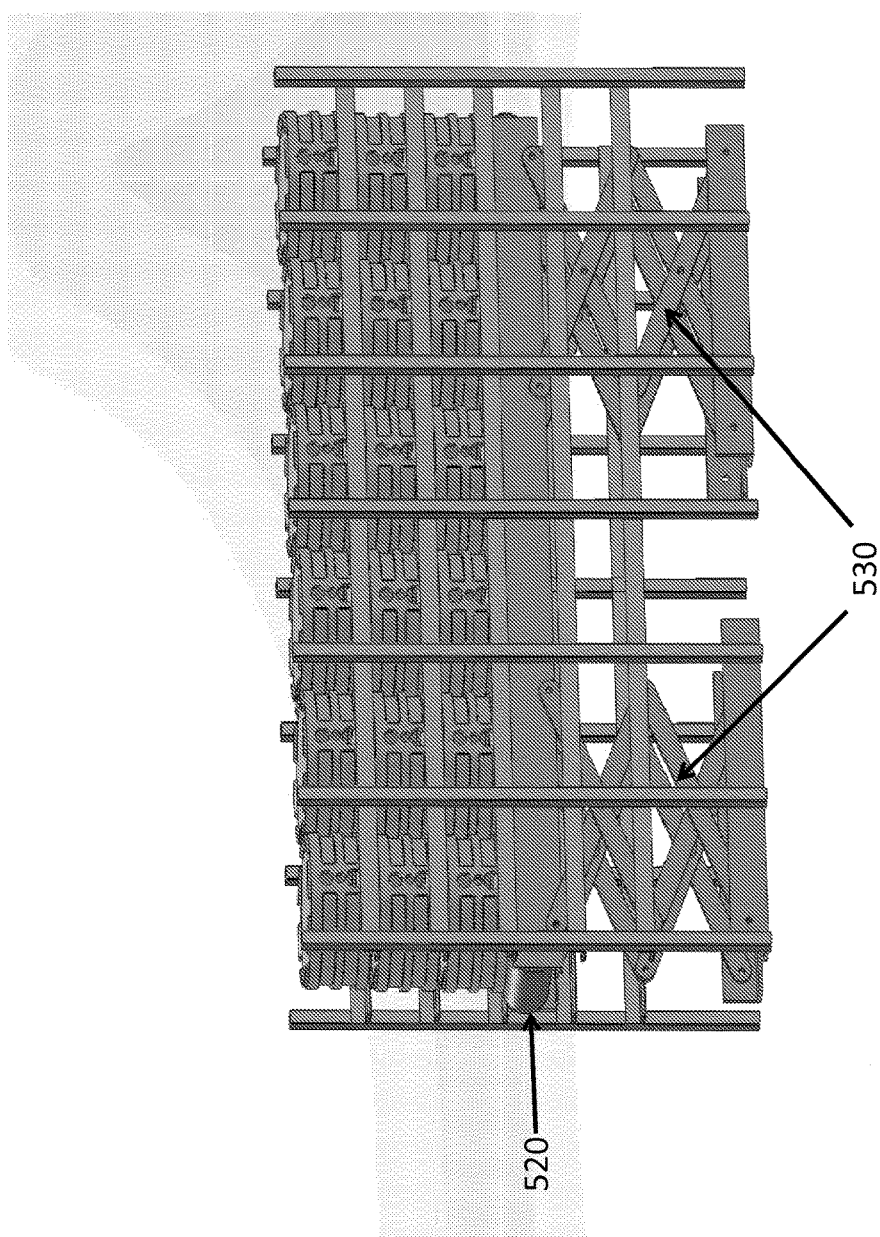
FIG. 3 schematically illustrates an operation mode of the conveyance mechanism illustrated in FIG. 1, according to an illustrative aspect of the invention.

As illustrated in FIG. 3, the horizontal conveyance mechanism 520 can be elevated to engage nodes on any tier. The elevation mechanism may be, e.g., one or more scissor jacks 530 as shown, but other elevating mechanisms could be used (covered subsequently).

In a particular aspect, only a single vertically movable conveyance mechanism is disposed in the open space traversable by the respective one or more conveyance mechanisms; that is, for any given number of conveyance mechanisms disposed along the length of a rack or racks, only a single conveyance mechanism occupies the open space vertically serviceable by the given conveyance mechanism.

Figure 4:
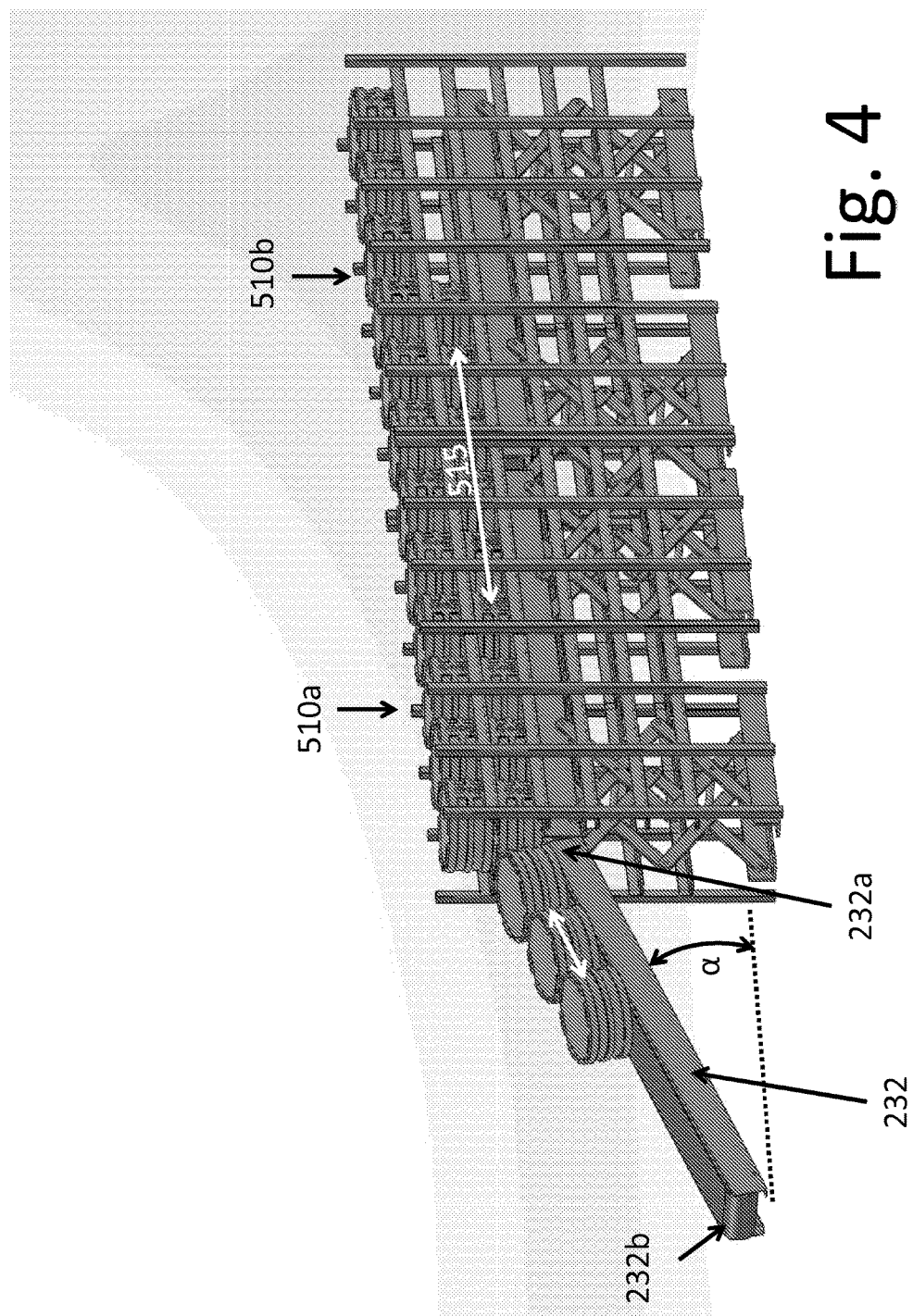
FIG. 4 schematically illustrates an in-line, end-to-end replication of the apparatus of FIG. 1, according to an illustrative aspect of the invention.

FIG. 4 illustrates an in-line, end-to-end replication of racks 510a, 510b. One can see that activation of the belts will pass nodes from rack to rack and eventually off/on to/from the movable conveyor 232 (also called the bridge). Bridge 232 is adjustable through some angle α such that its first end 232a reaches all item tiers and allow the nodes to move from their storage level 515 to/from the working conveyor transport level 236 at the conveyor's second end 232b.

Figure 5:
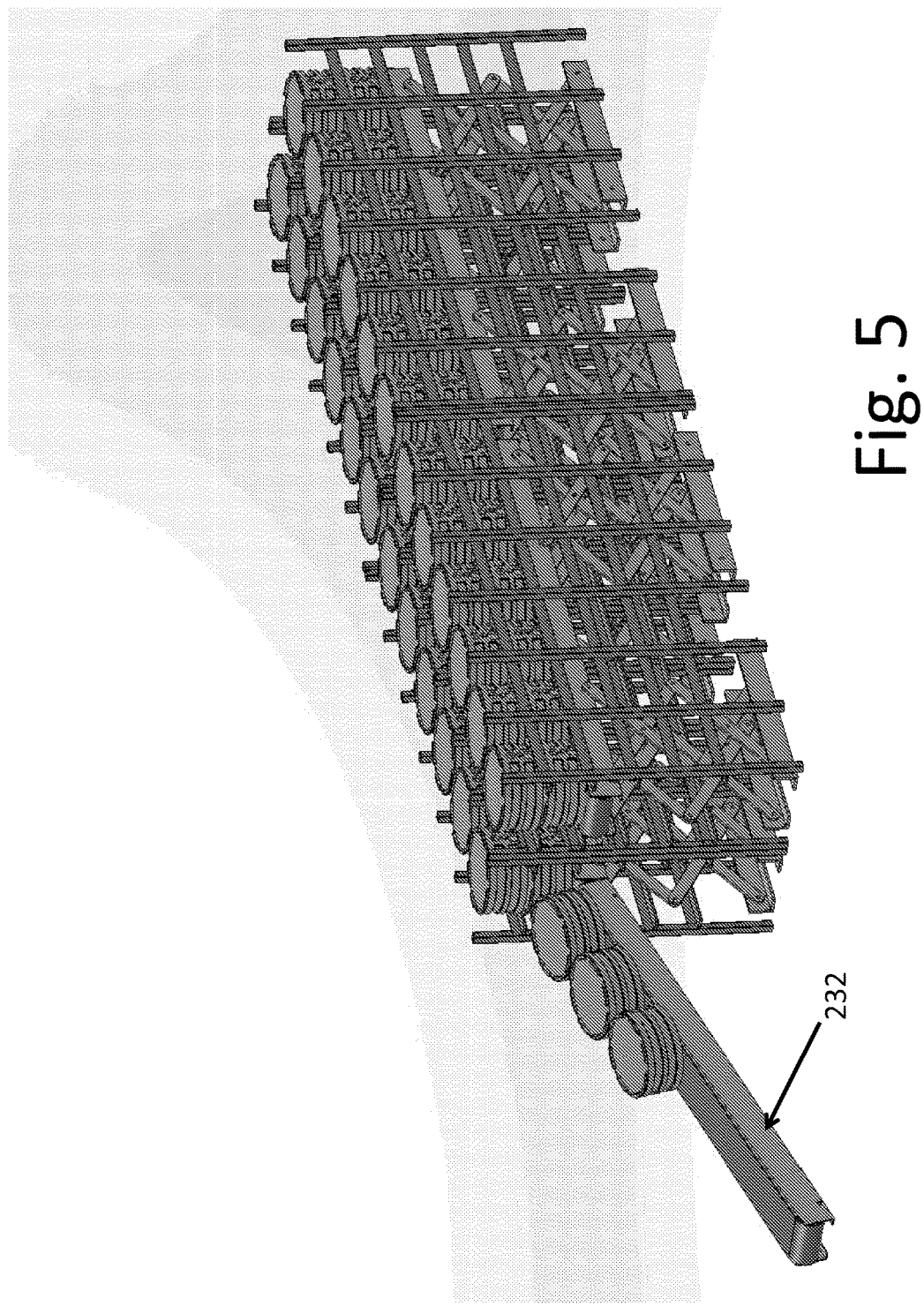
FIG. 5 schematically illustrates the in-line, end-to-end replication of the apparatus of FIG. 4 further replicated side-by-side, according to an illustrative aspect of the invention.
Figure 6:
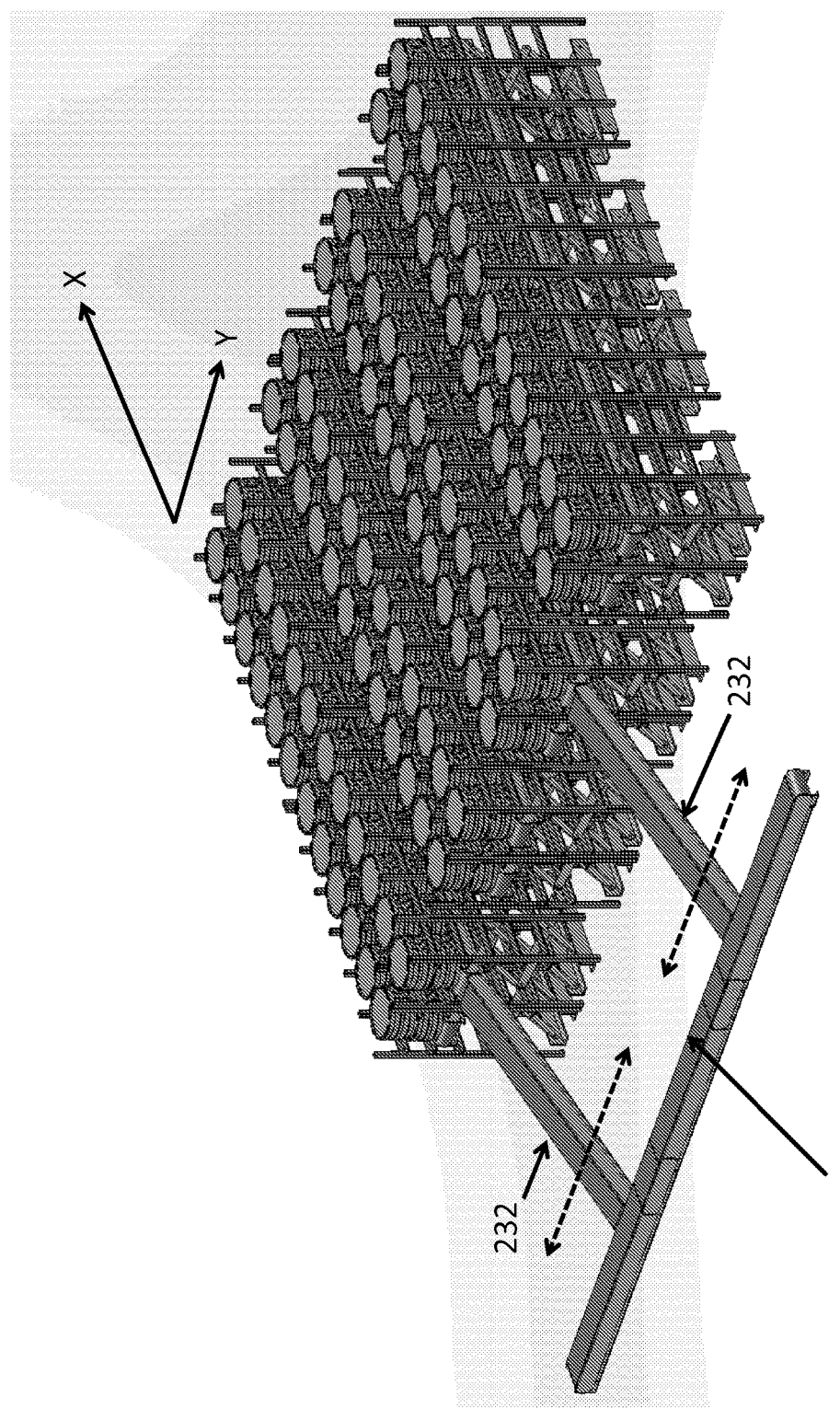
FIG. 6 schematically illustrates an exemplary item storage, dispensing, and receiving apparatus with conventional conveyance mechanism for unloading and dispensing the items, according to an illustrative aspect of the invention.

The racks can be replicated side-by-side (FIG. 5) wherein each row might share a transversely movable bridge 232 to carry nodes to the working transport level 236. Such pairs may be further replicated side-by-side with nominal intervening space for service access as illustrated in FIG. 6. This rack replication pattern may be continued as required in both X and Y directions, where all rows are serviced by one or more movable bridges 232.

Figure 9:
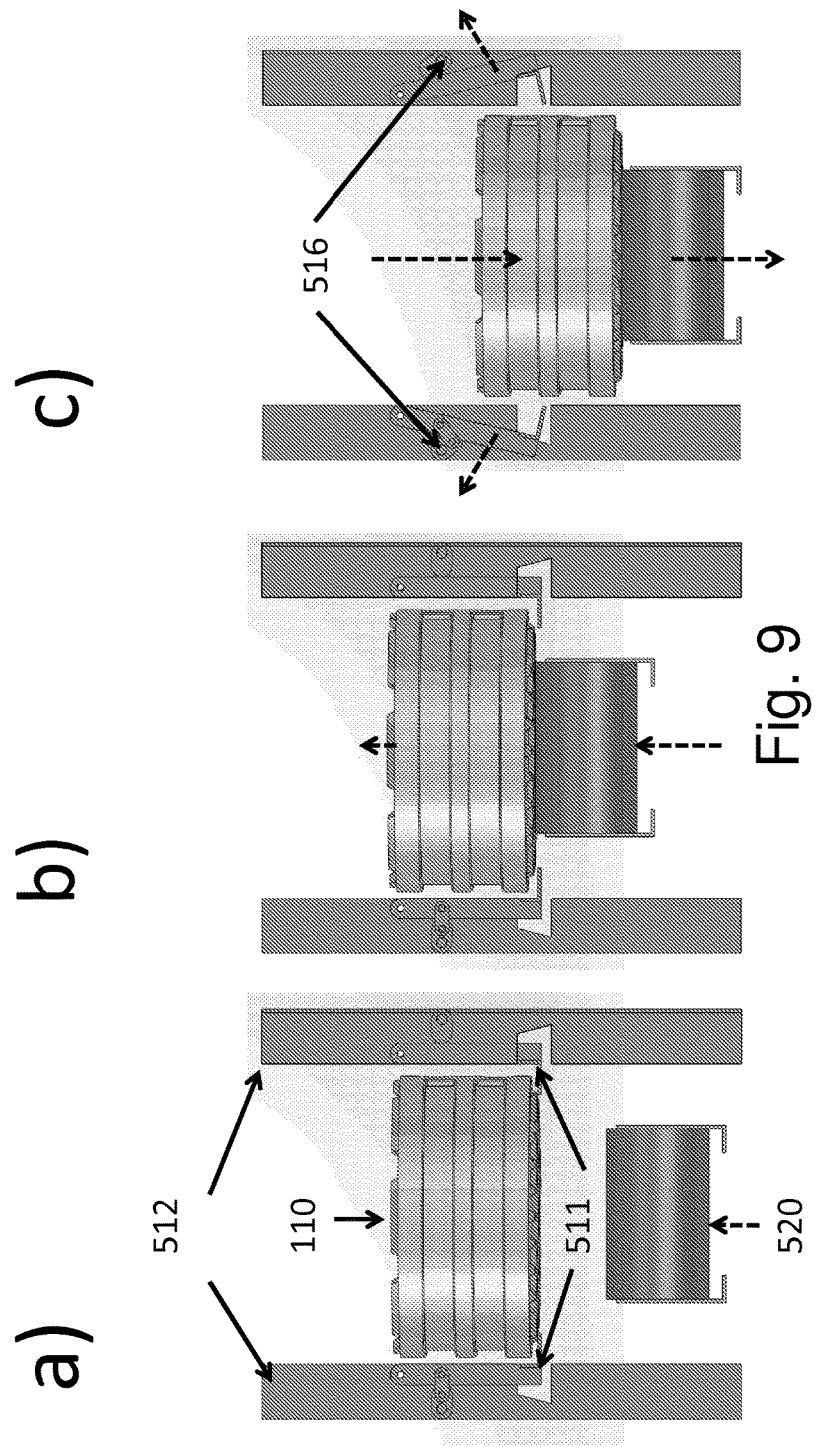
FIGS. 9a, 9b, 9c schematically illustrate an operational sequence of the apparatus of FIG. 8, according to an illustrative aspect of the invention.
Figure 10:
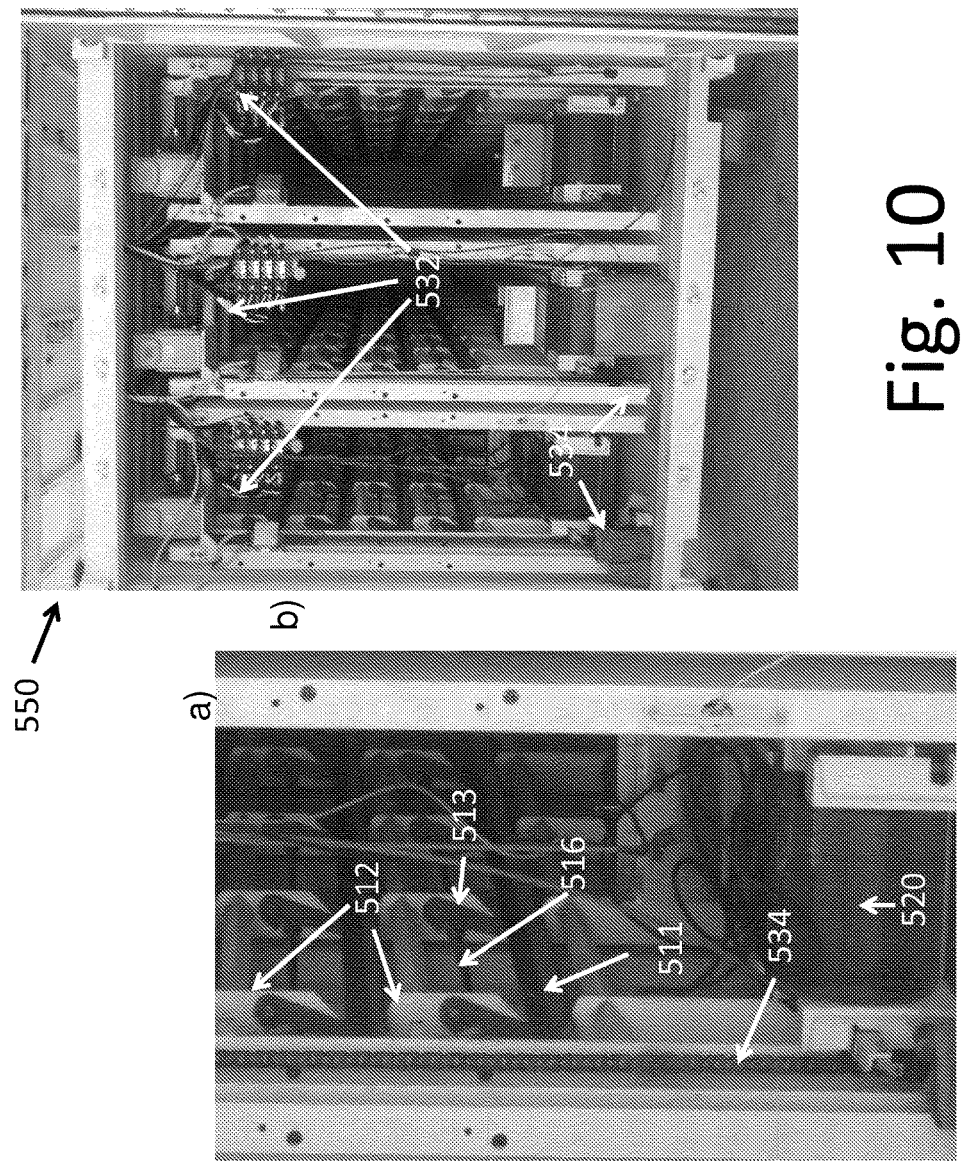
FIGS. 10a, 10b are photographs of a fully implemented item storage, dispensing, and receiving apparatus, according to an illustrative aspect of the invention.

As shown in FIG. 6, the bridge conveyor(s) 232 take substantial space across the entire width of the vessel or area where the racks are located, whether laterally movable to service multiple racks or not. An alternative embodiment is illustrated with reference to FIGS. 8, 9, 10.

As described above, the rack 510 is composed of horizontal angle support members 511 that are rigidly affixed to the vertical support members 512 as further indicated in FIG. 7a. Nodes 110 are supported on those fixed horizontal angles as indicated in FIG. 7b.

As illustrated in FIGS. 8a, 8b, the horizontal angle support members 511 are affixed to a hanging arm 513 that can pivot on vertical support members 512; the vertical support members 512 are cut away sufficiently as shown to allow the horizontal supports 511 to be drawn back; an activation rod 516 is rigidly connected to a cam 515 and that cam is flexibly affixed to a coupling link 514, which couples the cam 515 to the hanging arm 513. Rotating the activation rod 516 will cause the horizontal supports 511 to be drawn back away from the open center area of the assembly and retracted into the cut-away regions (FIG. 8b).

Figure 8:
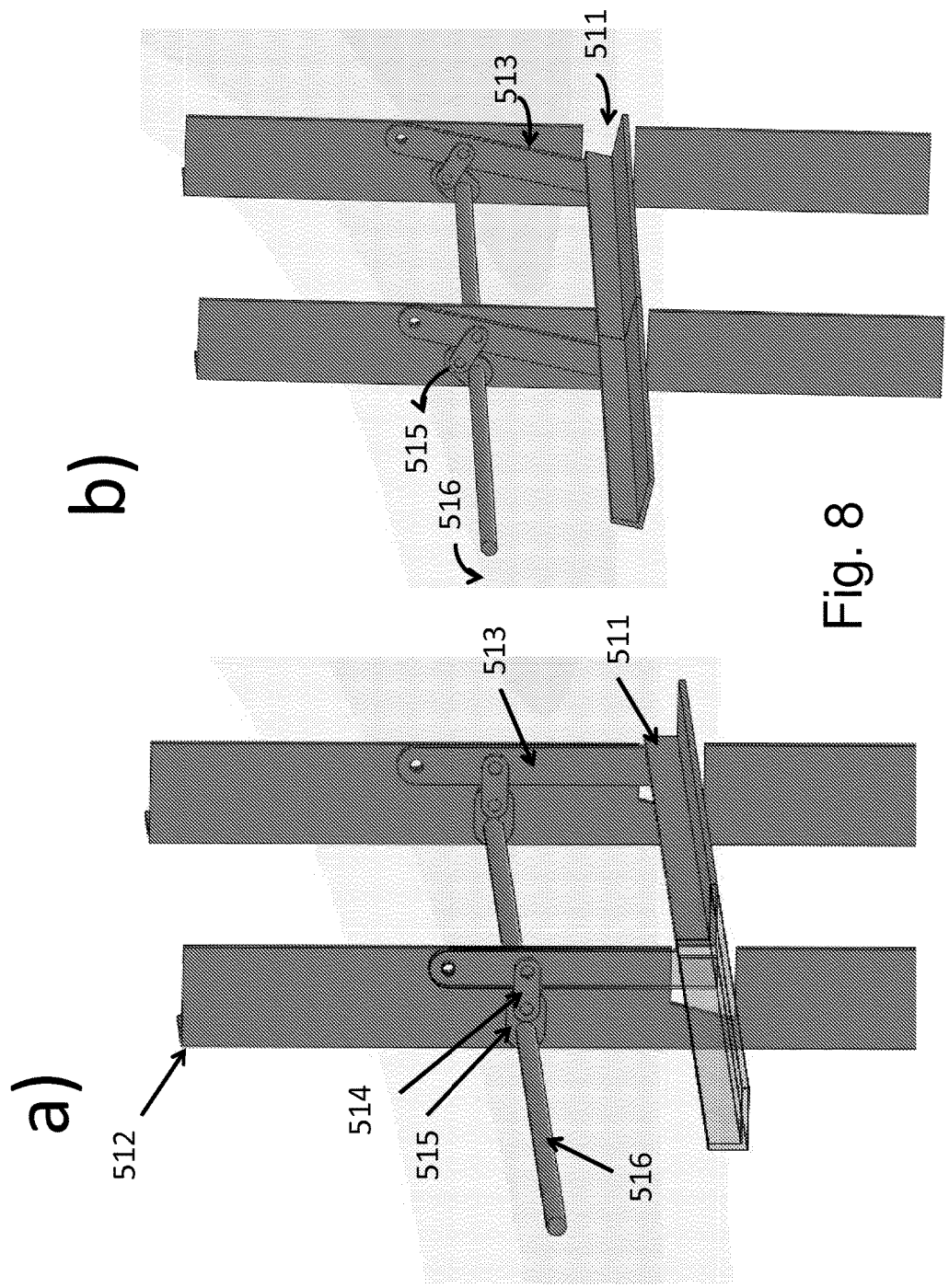
FIGS. 8a, 8b schematically illustrate an alternative embodiment of an item storage, dispensing, and receiving apparatus, according to an illustrative aspect of the invention.

FIG. 9a is the front view of the apparatus of FIG. 8 illustrating the embodied method of operation. The horizontal conveyance mechanism 520 is raised in FIG. 9b until it engages the lowest tiered node(s) 110 and raises them from contact with the horizontal angle support members 511. The horizontal angle support members 511 are retracted by rotating activation rod 516, leaving the nodes free to be moved vertically down (or up) via the down/up movement of the conveyor 520 (FIG. 9*c*) and ultimately to the working transport level 236 (FIG. 6).

FIGS. 10*a*, 10*b* are photographs of a fully implemented retractable rail rack 550 as described above. To illustrate the aforementioned point that the horizontal conveyance mechanism 520 can be raised and lowered by other means than a scissors mechanism, in the case implemented the horizontal conveyance mechanism 520 is lifted and lowered on chain 534 by gearbox and motors 532 atop the racks. For added illustration and not limitation, the horizontal conveyance mechanism 520 may be lifted by a worm gear, rack and pinion, or other suitable, known mechanical means.

Figure 11:
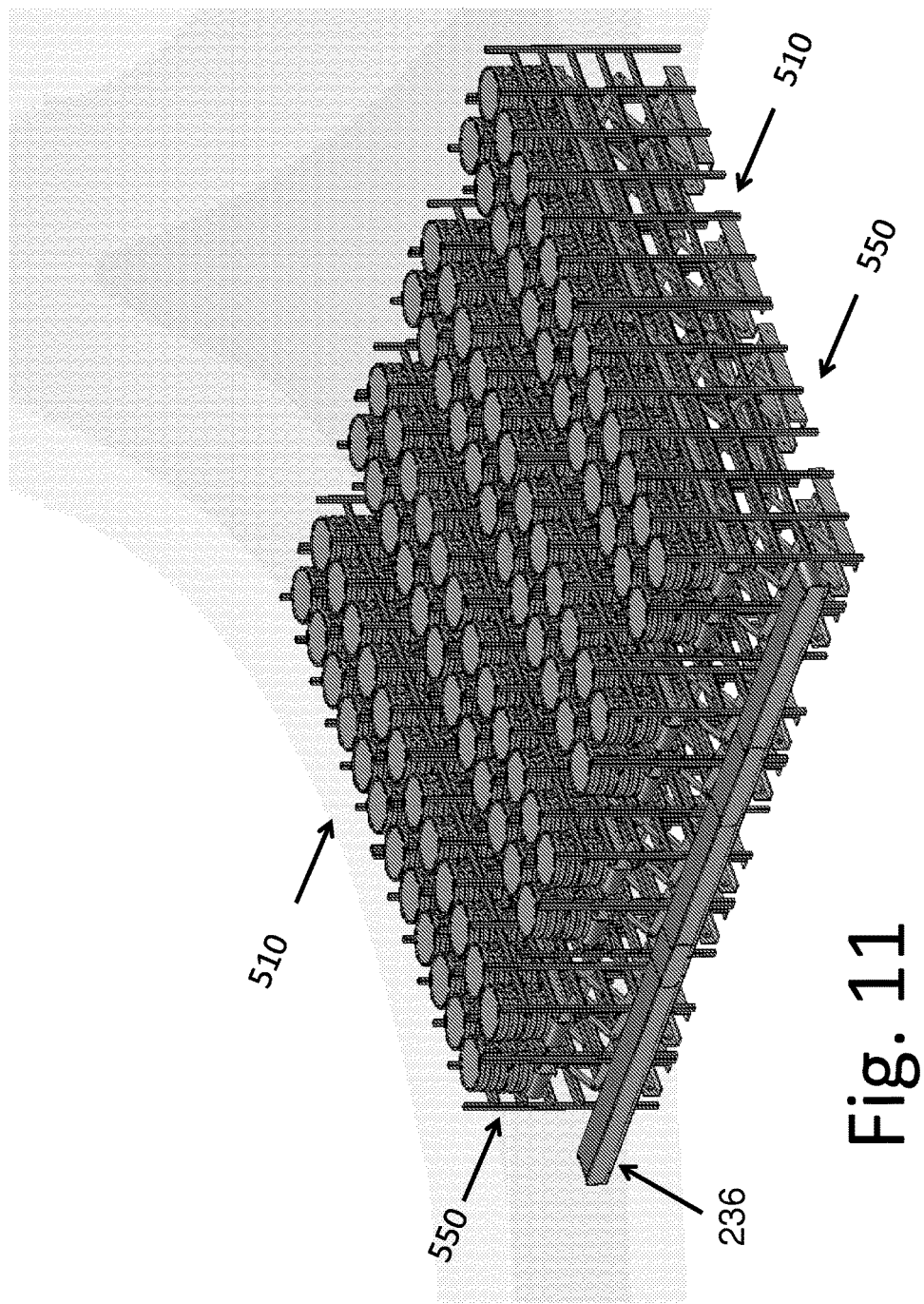
FIG. 11 schematically illustrates a lateral conveyor disposed in front of additional rows of storage racks enabled by the invention, according to an illustrative aspect of the invention.

FIG. 11 illustrates a conveyor 236 disposed laterally in front of additional rows of storage racks 550 that occupy the space previously needed for the bridge conveyors 232 (FIG. 6) because the racks 550 are themselves able to raise or lower nodes to the working conveyor transport level 236.

Figure 12:
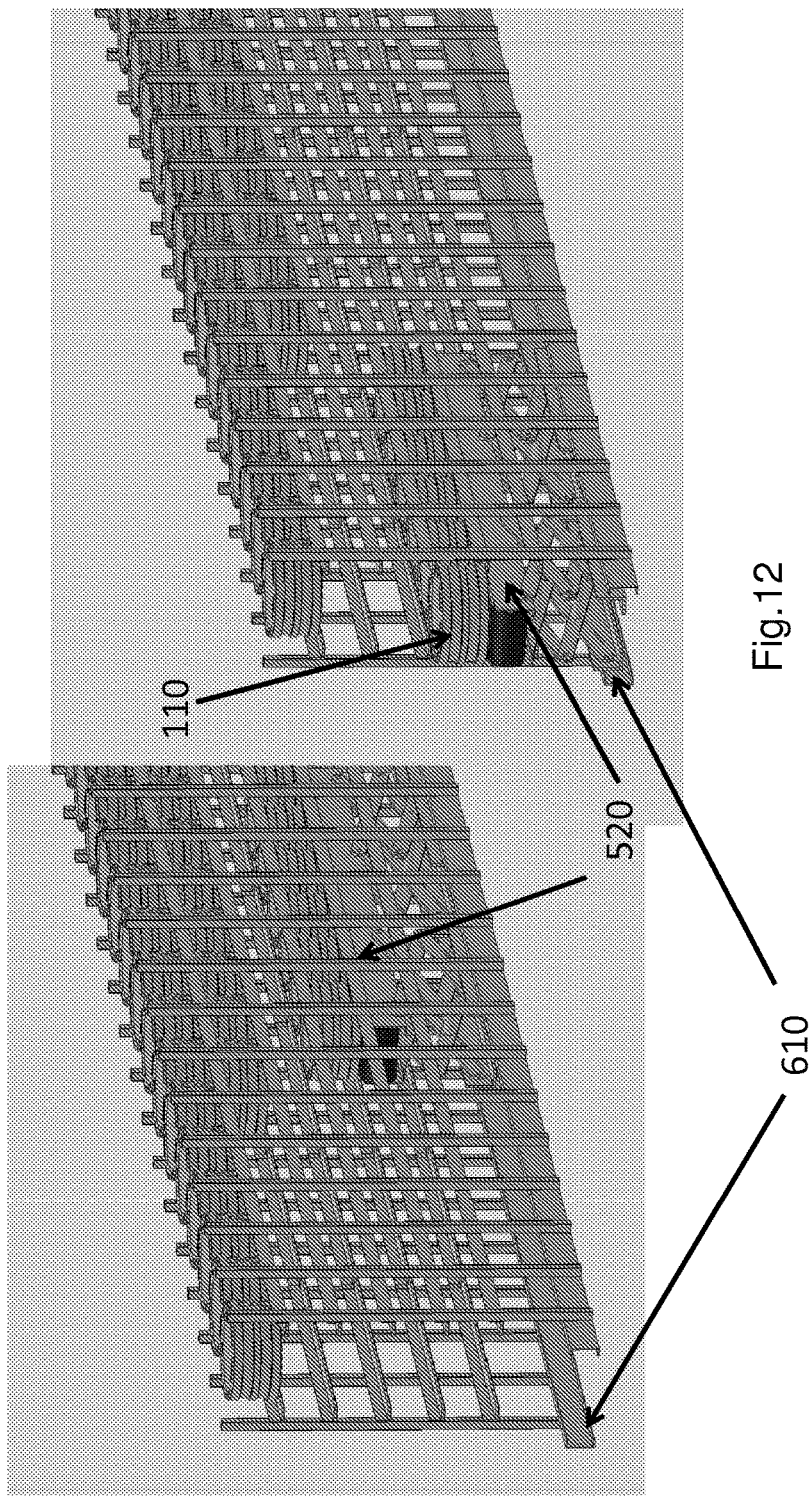
FIGS. 12-14 schematically illustrate alternative aspects of item transport mechanisms, according to illustrative aspects of the invention.
Figure 13:
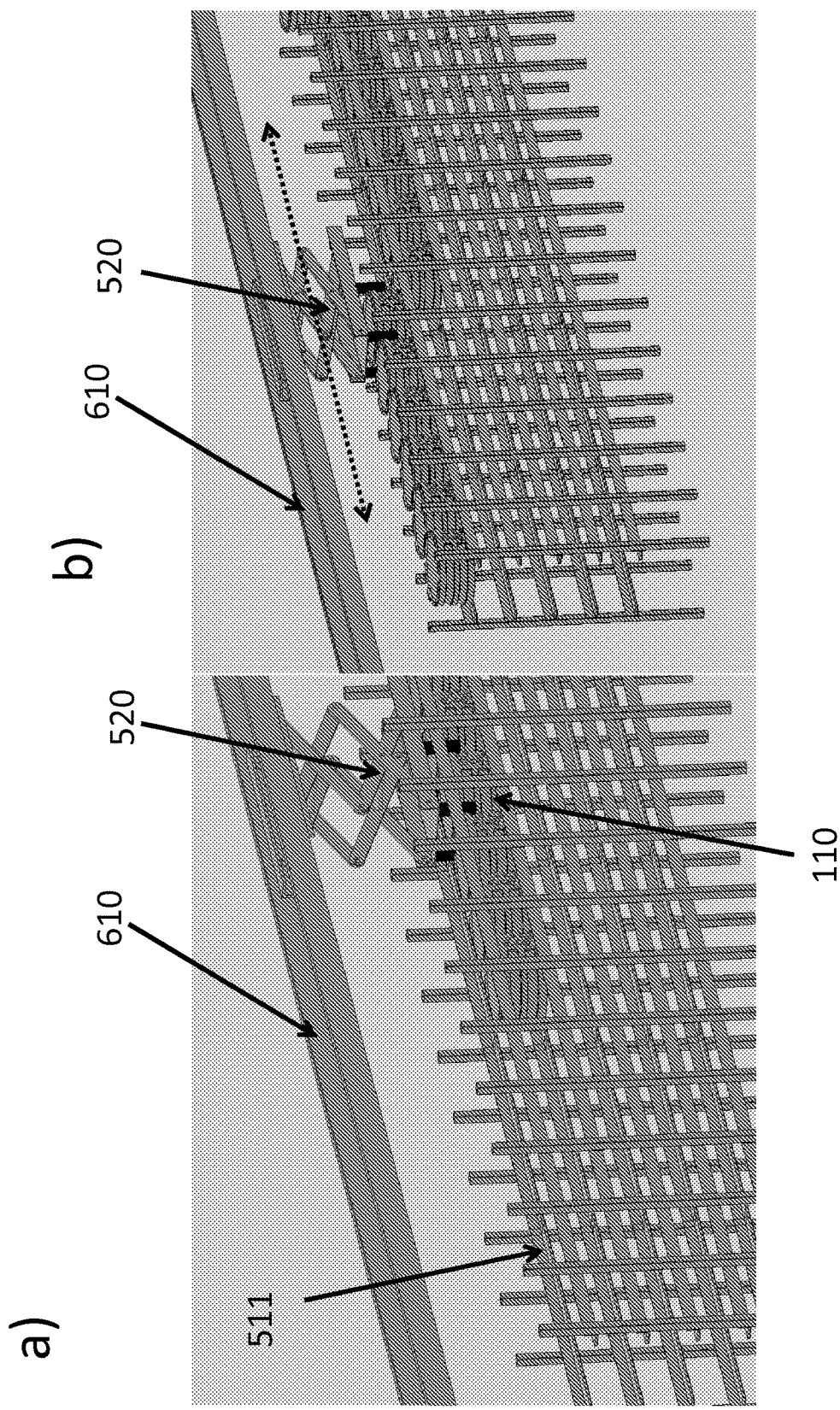

FIGS. 12-13 schematically illustrate alternative aspects of item transport mechanisms. As illustrated in FIGS. 12*a*, 12*b*, the vertically movable conveyance mechanism 520, rather than (or in addition to) horizontally moving items using a movable conveyor belt, itself can be moved on rails 610 affixed, e.g., to the deck (FIG. 12*b*).

A related embodiment is schematically illustrated in FIGS. 13*a* and 13*b*, which illustrate a different horizontal conveyance mechanism 520. Rails (or tracks) 610 are provided above the open space of the racks 510. A horizontal conveyance mechanism 520 is movably attached to the rails/tracks and can be vertically raised and lowered by, e.g., the illustrated scissors mechanism. As illustrated, the conveyance mechanism may comprise fingers or hanger members 633 that can engage one or more nodes 110 and slide them along the horizontal support members 511, which might be made of, or covered with, a low friction material (not shown).

In an embodiment, the system may include both a top-mounted, vertically movable conveyance mechanism as illustrated, e.g., in FIG. 13 and a bottom-mounted, vertically movable conveyance mechanism as illustrated, e.g., in FIG. 1-7, 8-11, or 12. Accordingly, the one or more conveyance mechanisms that are movable in a vertical direction traversing the open space along the height H of the frame assembly may be disposed in vertical opposition, such that items in a lowest tier adjacent the bottom-mounted conveyance mechanism can be conveyed via the bottom-mounted conveyance mechanism and items in a highest tier adjacent the top-mounted conveyance mechanism can be conveyed via the top-mounted conveyance mechanism.

Figure 14:
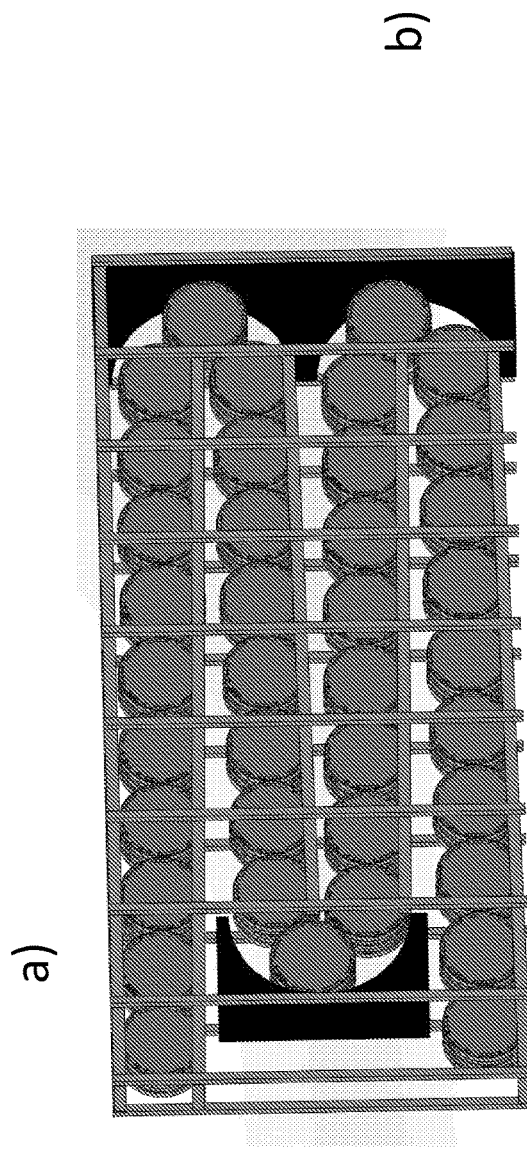

FIG. 14*a* illustrates another ultra-dense storage apparatus and method embodiment. In this arrangement, inclined planes with no machinery or moving parts are disposed in vertical spaced relation with curved end panels as shown. Rounded/rollable items can thus be transported by gravity alone. Because there are no moving parts or wearing surfaces, no service access needs to be provided, so the racks can abut each other side-by-side to provide very dense storage (FIG. 14*b*).

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited. In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. An item storage, dispensing, and receiving apparatus, comprising:
    a frame assembly having a height, H, and a length L, including at least one section thereof having two opposing side wall sections, wherein each opposing side wall section includes a plurality of vertically spaced, opposed rails, further wherein the at least one section has an open space fully extending intermediate the plurality of vertically spaced rails between the two opposing side wall sections over the height H and the length L;
    one or more conveyance mechanisms operatively disposed within the open space along at least a portion of the length L, wherein the one or more conveyance mechanisms are movable in a vertical direction traversing the open space along the height H; and
    a plurality of hanging arms pivotally connected at a region thereof to a corresponding activation member that is connected to the frame assembly, wherein each one of the plurality of rails is fixedly attached to a distal region of each of the corresponding hanging arms, further wherein at least portions of the side walls have cut-out regions such that, upon activation of the activation member, the rails are movable into and out of their respective cut-out regions such that the rails are, respectively, disposed out of or in the open spaces,
    further wherein when opposing rails are disposed in their respective open spaces the open space of the at least one section fully extends between the two opposing side wall sections.

2. The apparatus of claim 1, wherein the one or more conveyance mechanisms comprise powered conveyor belts and are coupled to one or more lifting mechanisms adapted to controllably position the one or more conveyance mechanisms in the vertical direction in the open space along the height H of the frame assembly.

3. The apparatus of claim 2, wherein the one or more lifting mechanisms are disposed below the one or more respective conveyance mechanisms.

4. The apparatus of claim 2, wherein the one or more respective lifting mechanisms are disposed on a portion of the frame assembly.

5. The apparatus of claim 1, further comprising a track disposed in the open space adjacently below a lowest corresponding set of rails of the frame assembly along at least a portion of the length L, wherein the one or more conveyance mechanisms are movably coupled to the track.

6. An item storage, dispensing, and receiving apparatus, comprising:
    a frame assembly having a height, H, and a length, L, including at least one section thereof having two opposing side wall sections, wherein each opposing side wall section includes a plurality of vertically spaced, opposed rails, further wherein the at least one section has an open space fully extending intermediate the plurality of vertically spaced rails between the two opposing side wall sections over the height H and the length L; and
    one or more conveyance mechanisms operatively disposed within the open space along at least a portion of the length L, wherein the one or more conveyance mechanisms are movable in a vertical direction traversing the open space along the height H,
    wherein the frame assembly has an item-input/output end, further comprising a bridge conveyance mechanism having a first end and a second end, further wherein one of the first end and the second end of the bridge conveyance mechanism is operatively coupled to a leading one of the one or more conveyance mechanisms at the input/output end of the frame assembly such that as the one or more conveyance mechanisms move in a vertical direction traversing the open space along the height H, the bridge conveyance mechanism pivots about the other of the first end and the second end thereof so as to provide a continuous path between the leading one of the one or more conveyance mechanisms at the input/output end of the frame assembly and the bridge conveyance mechanism.

7. An item storage, dispensing, and receiving apparatus, comprising:
    a frame assembly having a height, H, and a length, L, including at least one section thereof having two opposing side wall sections, wherein each opposing side wall section includes a plurality of vertically spaced opposed rails, further wherein the at least one section has an open space fully extending intermediate the plurality of vertically spaced rails between the two opposing side wall sections over the height H and the length L;
    at least two of the frame assemblies and respective one or more conveyance mechanisms disposed immediately sideways adjacently,
    wherein each of the frame assemblies has an item-input/output end, further comprising a bridge conveyance mechanism having a first end and a second end, further wherein one of the first end and the second end of the bridge conveyance mechanism is operatively coupled to a leading one of the one or more conveyance mechanisms of one of the at least two of the frame assemblies at the input/output end thereof such that as the one or more conveyance mechanisms move in a vertical direction traversing the open space along the height H, the bridge conveyance mechanism pivots about the other of the first end and the second end thereof so as to provide a continuous path between the leading one of the one or more conveyance mechanisms of one of the at least two of the frame assemblies at the input/output end and the bridge conveyance mechanism, further wherein the bridge conveyance mechanism is laterally repositionable such that it can be operatively coupled to the leading one of the one or more conveyance mechanisms of the other one of the at least two of the frame assemblies at the input/output end thereof.

8. An item storage, dispensing, and receiving apparatus, comprising:
   a frame assembly having a height, H, and a length, L, including at least one section thereof having two opposing side wall sections, wherein each opposing side wall section includes a plurality of vertically spaced, opposed rails, further wherein the at least one section has an open space fully extending intermediate the plurality of vertically spaced rails between the two opposing side wall sections over the height H and the length L;
   at least two of the frame assemblies and respective one or more conveyance mechanisms disposed immediately sideways;
   a plurality of the immediately sideways adjacent at least two of the frame assemblies and respective one or more conveyance mechanisms disposed sideways adjacently, wherein each of the frame assemblies has an item-input/output end, further comprising a plurality of bridge conveyance mechanisms each having a first end and a second end, further wherein one of the first end and the second end of each of the bridge conveyance mechanisms is operatively coupled to a leading one of the plurality of the immediately sideways adjacent at least two of the frame assemblies and respective one or more conveyance mechanisms at the input/output ends thereof such that as the one or more conveyance mechanisms move in a vertical direction traversing the open space along the height H, each of the respective bridge conveyance mechanisms pivots about the other of the first end and the second end thereof so as to provide a continuous path between the leading ones of the one or more conveyance mechanisms of one of the plurality of the frame assemblies at the input/output ends and the bridge conveyance mechanisms, further wherein the bridge conveyance mechanisms are laterally repositionable.

9. The apparatus of claim 1, wherein the item is one or more seismic sensor nodes, movably disposed on the rails.

10. The apparatus of claim 8, wherein each of the frame assemblies has an item-input/output end, further comprising a different conveyance mechanism disposed adjacently transverse to the input/output ends of the plurality of the immediately sideways adjacent at least two of the frame assemblies.

11. The apparatus of claim 10, wherein the different conveyance mechanism comprises a plurality of linearly adjacent conveyance mechanisms aligned in a horizontal plane.

12. The apparatus of claim 1, replicated end on end.

13. The apparatus of claim 1, further wherein only a single conveyance mechanism is disposed in the open space traversable by the respective one or more conveyance mechanisms.

14. The apparatus of claim 1, further wherein the one or more conveyance mechanisms that are movable in a vertical direction traversing the open space along the height H of the frame assembly are disposed in vertical opposition.

15. The apparatus of claim 6, further comprising:
   a frame assembly having a height, H, and a length, L, including at least one section thereof having two opposing side wall sections, wherein each opposing side wall section includes a plurality of vertically spaced, opposed rails, further wherein the at least one section has an open space fully extending intermediate the plurality of vertically spaced, opposed rails over the height H and the length L;
   a track disposed adjacent a top of the frame assembly over the open space along at least a portion of the length L; and
   a horizontal conveyance mechanism moveably coupled to the track, wherein the conveyance mechanism is further moveable in a vertical direction traversing the open space along the height H.

16. The apparatus of claim 15, wherein the conveyance mechanism includes a hanger member adapted to engage the item for movement.

* * * * *